United States Patent
Tan et al.

(10) Patent No.: US 10,242,821 B2
(45) Date of Patent: *Mar. 26, 2019

(54) LOCALIZED KEY-CLICK FEEDBACK

(71) Applicant: Microsoft Technology Licensing, LLC, Redmond, WA (US)

(72) Inventors: Hong Z. Tan, Beijing (CN); Zhaoyuan Ma, Beijing (CN); Chen Zhao, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 246 days.

This patent is subject to a terminal disclaimer.

(21) Appl. No.: 15/269,818

(22) Filed: Sep. 19, 2016

(65) Prior Publication Data

US 2017/0040129 A1 Feb. 9, 2017

Related U.S. Application Data

(63) Continuation of application No. 13/894,866, filed on May 15, 2013, now Pat. No. 9,448,628.

(51) Int. Cl.
*H01L 41/09* (2006.01)
*H01H 13/85* (2006.01)
(Continued)

(52) U.S. Cl.
CPC ............ *H01H 13/85* (2013.01); *G06F 3/016* (2013.01); *H01H 13/83* (2013.01); *H01H 57/00* (2013.01);
(Continued)

(58) Field of Classification Search
CPC ........ H01H 57/00; H01H 13/83; H01H 13/85; H01H 2057/006; H01H 2215/00; H01H 2215/052; G06F 3/016; G06F 2203/04809
(Continued)

(56) References Cited

U.S. PATENT DOCUMENTS 3,940,637 A 2/1976 Ohigashi et al.
4,516,112 A 5/1985 Chen
(Continued)

FOREIGN PATENT DOCUMENTS

CN 101763192 6/2010
CN 101803052 A 8/2010
(Continued)

OTHER PUBLICATIONS

European Office Action dated Nov. 29, 2016 for European Patent Application No. 14733773.7, a counterpart foreign application of U.S. Pat. No. 9,448,628, 3 pages.
(Continued)

*Primary Examiner* — Thomas Dougherty
(74) *Attorney, Agent, or Firm* — Drinker Biddle & Reath LLP

(57) ABSTRACT

Disclosed herein are techniques and systems for providing simulated, haptic feedback that is local to physical, non-actuating keys of a keyboard. A keyboard includes a plurality of non-actuating keys defined in a cover portion of the keyboard, a plurality of force-producing mechanisms coupled to a substrate underneath and adjacent the cover portion. The force-producing mechanisms may be positioned on suspended portions of the substrate that are mechanically isolated and arranged on the substrate to substantially correspond to a layout of the plurality of non-actuating keys. The force-producing mechanisms may be individually actuated to deflect the suspended portions of the substrate underneath the cover portion to create a tactile sensation for a user's finger that is local to a particular key. In some embodiments, the force-producing mechanisms are piezoelectric actuators.

20 Claims, 6 Drawing Sheets

(51) Int. Cl.
*G06F 3/01* (2006.01)
*H01H 13/83* (2006.01)
*H01H 57/00* (2006.01)

(52) U.S. Cl.
CPC ............ *G06F 2203/04809* (2013.01); *H01H 2057/006* (2013.01); *H01H 2215/00* (2013.01); *H01H 2215/052* (2013.01)

(58) Field of Classification Search
USPC .......................................... 310/311, 328, 338
See application file for complete search history.

(56) References Cited

U.S. PATENT DOCUMENTS

| | | | |
|---|---|---|---|
| 5,231,326 | A | 7/1993 | Echols |
| 5,883,459 | A | 3/1999 | Cline |
| 6,429,846 | B2 | 8/2002 | Rosenberg et al. |
| 7,045,933 | B2 | 5/2006 | Dollgast |
| 7,667,371 | B2 | 2/2010 | Sadler et al. |
| 7,952,261 | B2 | 5/2011 | Lipton et al. |
| 8,339,250 | B2 | 12/2012 | Je et al. |
| 9,448,628 | B2 * | 9/2016 | Tan .................. G06F 3/016 |
| 2007/0146348 | A1 | 6/2007 | Villain |
| 2007/0165297 | A1 | 7/2007 | Sandner et al. |
| 2008/0117166 | A1 | 5/2008 | Rosenberg |
| 2008/0251364 | A1 | 10/2008 | Takala et al. |
| 2009/0072662 | A1 | 3/2009 | Sadler et al. |
| 2009/0167704 | A1 | 7/2009 | Terlizzi et al. |
| 2010/0038227 | A1 | 2/2010 | Lu |
| 2010/0052880 | A1 | 3/2010 | Laitinen et al. |
| 2011/0012717 | A1 | 1/2011 | Pance et al. |
| 2011/0148608 | A1 | 6/2011 | Grant et al. |
| 2011/0193787 | A1 | 8/2011 | Morishige et al. |
| 2012/0039057 | A1 | 2/2012 | Paleczny et al. |
| 2012/0068957 | A1 | 3/2012 | Puskarich et al. |
| 2012/0223824 | A1 | 9/2012 | Rothkopf |
| 2013/0002556 | A1 | 1/2013 | Griffin |
| 2014/0152148 | A1 | 6/2014 | Oh et al. |
| 2014/0340208 | A1 | 11/2014 | Tan et al. |
| 2015/0122621 | A1 | 5/2015 | Fukumoto |
| 2017/0084408 | A1 | 3/2017 | Fukumoto |

FOREIGN PATENT DOCUMENTS

| | | |
|---|---|---|
| CN | 201955733 U | 8/2011 |
| CN | 102236463 | 11/2011 |
| CN | 102750030 | 10/2012 |
| EP | 0525374 A1 | 2/1993 |
| EP | 1699065 A2 | 9/2006 |
| EP | 2418705 A1 | 2/2012 |
| JP | 401130215 | 5/1989 |
| WO | 2010085575 A1 | 7/2010 |

OTHER PUBLICATIONS

Blankenship, Tim, "Tactile feedback solutions using piezoelectric actuators (Part 1 of 2)", retrieved on Jul. 5, 2013 at <<http://www.eetimes.com/document.asp?doc_id=1278418>>, EE Times, Nov. 17, 2010, 5 pages.

Hughes, "Apple's Haptic touch feedback concept uses actuators, senses force on iPhone, iPad", retrieved from <<http://appleinstider.com/articles/12/03/22/apples_haptic_touch_feedback_concept_uses_actuators_senses_force_on_iphone_ipad>>, Mar. 22, 2012, 8 pages.

International Preliminary Report for PCT Appl. PCT/US2014/063272 dated Feb. 16, 2016, 8 pages.

Kim, "A Masking Study of Key-Click Feedback Signals on a Virtual Keyboard", EuroHaptics'12, In Proceedings of the International Conference on Haptics: perception, devices, mobility, and communication, vol. Part I, Jun. 2012, pp. 247-257.

Levin et al., "Tactile-Feedback Solutions for an Enhanced User Experience", In Information Display, Oct. 2009, 4 pages.

Office action for U.S. Appl. No. 14/074,403, dated Jan. 25, 2016, Fukumoto, "Controller-Less Quick Tactile Feedback Keyboard ", 8 pages.

Office action for U.S. Appl. No. 13/894,866, dated Feb. 9, 2016, Tan et al., "Localized Key-Click Feedback", 10 pages.

Office action for U.S. Appl. No. 14/074,403, dated May 25, 2016, Fukumoto, "Controller-Less Quick Tactile Feedback Keyboard ", 5 pages.

PCT Search Report & Written Opinion for Application No. PCT/US2014/037940, dated Sep. 4, 2014, 11 pages.

PCT Search Report & Written Opinion for Application No. PCT/US2014/063272, dated Feb. 10, 2015, 10 pages.

"Second Written Opinion Issued in PCT Application No. PCT/US2014/063272", dated Oct. 12, 2015, 7 Pages.

"Office Action Issued in European Patent Application No. 14733773.7", dated Jan. 19, 2018, 9 Pages.

"Second Office Action Issued in Chinese Patent Application No. 201480027470.5", dated May 15, 2018, 11 Pages.

Chinese Office Action dated Apr. 5, 2017 for Chinese Patent Application No. 201480060700.8, a counterpart foreign application of U.S. Pat. No. 9,514,902, 12 pages.

"Office Action and Search Report Issued in Taiwan Patent Application No. 103114543", dated Jul. 20, 2017, 8 Pages.

"First Office Action and Search Report Issued in Chinese Patent Application No. 201480027470.5", dated Nov. 28, 2017, 15 Pages.

"Third Office Action Issue in China Patent Application No. 201480027470.5", dated Oct. 9, 2018, 11 Pages.

* cited by examiner (Section A-A)

(Section A-A)

LOCALIZED KEY-CLICK FEEDBACK

CROSS REFERENCE TO RELATED APPLICATION

This application is a continuation of co-pending, commonly owned U.S. patent application Ser. No. 13/894,866, filed May 15, 2013, entitled "LOCALIZED KEY-CLICK FEEDBACK," the entirety of which is herein incorporated by reference.

BACKGROUND

Keyboards are important and popular input mechanisms for providing input to a variety of computing devices. Notwithstanding the development of various alternative human input technologies, such as touchscreens, voice recognition, and gesture recognition, to name only a few, keyboards remain the most commonly used device for human input to computing devices. Most trained typists who are able to type at moderate to high speeds (i.e., about 50 words per minute or higher) tend to be reliant on haptic feedback (i.e., touch or tactile feedback), which indicates to the typist that a key has been depressed. Keyboards with mechanically movable keys (referred to herein as "mechanical keyboards") have generally met this need by providing some form of naturally occurring haptic feedback for a user who actuates these spring-loaded, movable keys of the keyboard. For example, one popular mechanism used for providing haptic feedback in traditional mechanical keyboards is a "buckling spring" mechanism underneath each key that buckles under sufficient pressure from a user's finger when the user actuates a key. The buckling of the spring causes a snapping action that provides a tactile sensation to the user to indicate that the key has been actuated.

As computing devices have become smaller and more portable with advances in computer technology, the traditional mechanical keyboard has become less common, especially for computing devices with relatively small form factors. This is because the technology used in mechanical keyboards may provide a design constraint on the maximum thinness of the keyboard. Manufacturers concerned with the portability of their devices have addressed this problem by developing alternative keyboard technologies that do not utilize mechanically movable keys. As a consequence, these keyboards with so called "non-actuating" keys may be made thinner and sleeker (~3 millimeters thick) than even the thinnest mechanical keyboards. For example, pressure sensitive keyboards do not require mechanically movable keys or parts. Thus, the main constraint on the thickness of a pressure sensitive keyboard is the material used for the component layers of the keyboard providing structure and sensing functions. These alternative keyboard technologies have enabled more portable computing devices and keyboards.

However, thinner keyboards with non-actuating keys (i.e., keys that generally do not mechanically actuate) fail to provide tactile feedback. Typists who use such keyboards can only feel their finger on the surface of the key, but cannot feel any movement of the key. Without haptic feedback, trained typists become unsure about whether a keystroke has registered, and they are forced to resort to visual feedback by checking finger placement, which slows down the typing speed. Although some forms of simulated feedback have been developed in an effort to recapture the feel of traditional mechanical keyboards, current techniques generally offer "global" tactile feedback (i.e., vibrating the entire keyboard or device), which does not meet the expectations of touch-based typists.

SUMMARY

Described herein are techniques and systems for providing simulated, haptic feedback that is local to individual, non-actuating keys of a physical keyboard. The haptic feedback may be in the form of a simulated "key-click" feedback for an individual key that is pressed by a user such that the finger used to press the key feels the tactile sensation. The feedback is "simulated" in the sense that it is not a natural result of pressing the key (i.e., the key is not mechanically movable). Instead, the haptic feedback mimics the tactile sensation of a mechanical key (e.g., buckling spring, pop-dome key switch, etc.) to give a user the perception that they have actuated a mechanically movable key.

In some embodiments, a keyboard assembly having a plurality of non-actuating keys on a cover portion of the keyboard assembly includes a plurality of force-producing mechanisms underneath each non-actuating key. The keyboard assembly may include a substrate adjacent to the cover portion of the keyboard assembly, where the substrate includes a plurality of suspended portions that are suspended and mechanically isolated from the substrate and arranged in a manner that substantially corresponds to a layout of the non-actuating keys of the keyboard. The force-producing mechanisms may be coupled to the substrate at positions that correspond to the suspended portions. The suspended portions are configured to be deflected in an out-of-plane direction relative to the substrate in response to force produced by the force-producing mechanisms. The force-producing mechanisms may be individually controlled such that mechanical force is isolated and local to each non-actuating key of the keyboard.

The keyboard described herein may not rely on mechanical parts for the actuation of keys on the keyboard, which allows for a thinner keyboard to facilitate portability. Elimination of mechanical parts for actuation of the keys also increases reliability and robustness due to fewer parts. Furthermore, localized haptic feedback may be experienced, which is familiar and useful to touch-based typists.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Embodiments of the present disclosure are directed to, among other things, techniques and systems for providing simulated, haptic feedback that is local to individual, non-actuating keys of a physical keyboard. Embodiments disclosed herein find particular application to keyboards integrated with, or used as a peripheral device to, slate or tablet computers, notebooks or laptop computers, and the like. In particular, the embodiments disclosed herein benefit portable computing devices by providing a relatively thin keyboard with improved portability that is also functional for a touch typist. However, it is to be appreciated that the disclosed embodiments may also be utilized for other applications, including remote control input devices for television or similar devices, gaming system controllers, mobile phones, automotive user input mechanisms, home automation (e.g., keyboards embedded in furniture, walls, etc.), and the like.

The techniques and systems disclosed herein utilize a plurality of force-producing mechanisms as part of a haptic feedback assembly in a keyboard with non-actuating keys. Although referred to herein as "force-producing mechanisms," it is to be appreciated that the term "force-producing" is meant to include both the forces produced by the force-producing mechanisms as well as the resultant displacements that occur from the forces produced, as both force and displacement may contribute to a tactile perception. The force-producing mechanisms may be positioned on a substrate in a layout that substantially corresponds to a layout of the non-actuating keys of the keyboard. The substrate may include a plurality of suspended portions that are mechanically isolated and configured to position the force-producing mechanisms coupled to the substrate. The substrate may be adjacent a cover portion of the keyboard containing the non-actuating keys such that mechanical force produced by each force-producing mechanism is isolated and local to each non-actuating key of the keyboard. In some embodiments, the force-producing mechanisms may be piezoelectric actuators. The simulated, haptic feedback creates a localized, tactile key-click sensation on a user's finger that presses upon an individual non-actuating key.

The techniques and systems described herein may be implemented in a number of ways. Example implementations are provided below with reference to the following figures.

Example Keyboard Assembly

Figure 1:
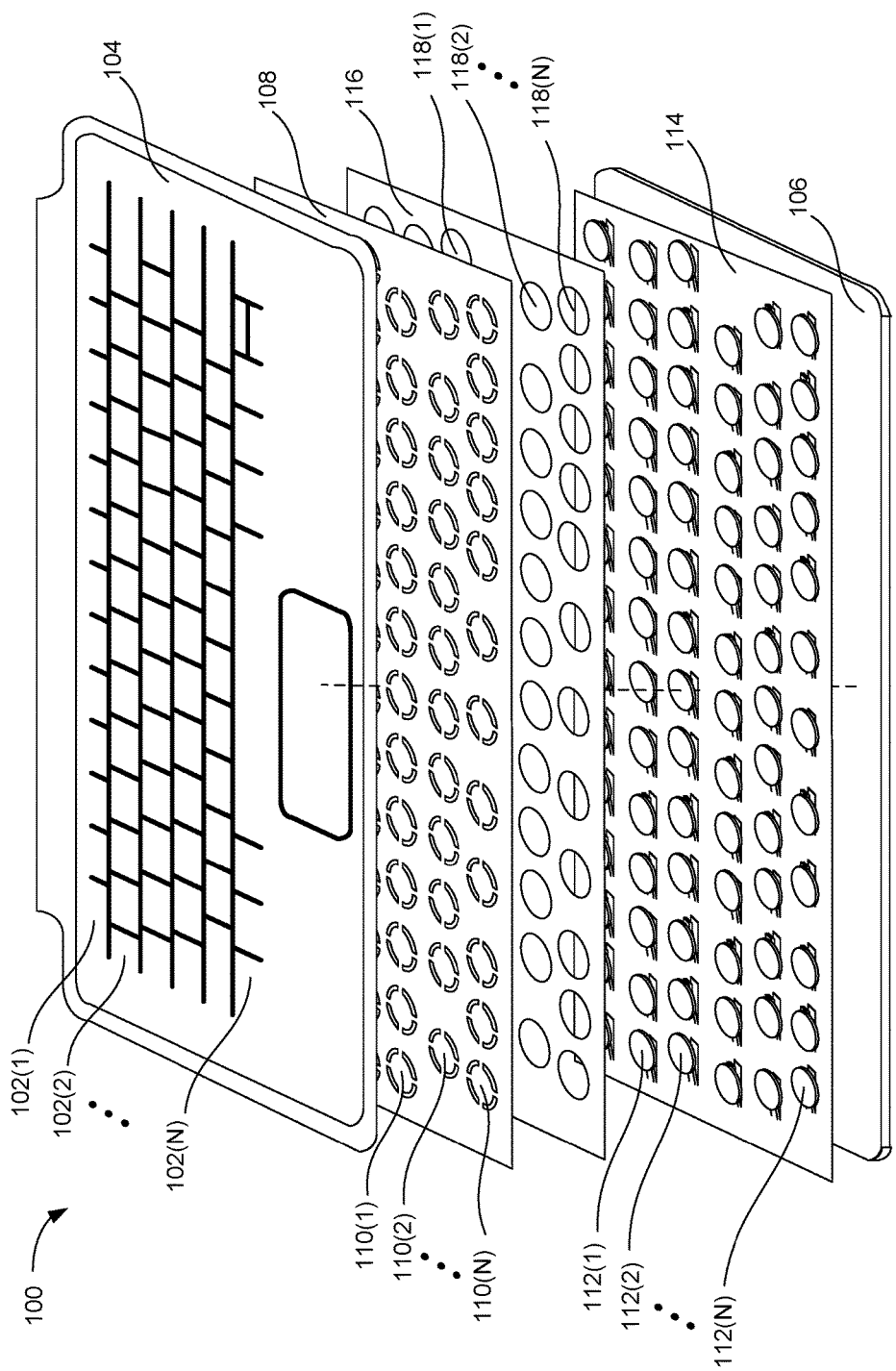
FIG. 1 illustrates an exploded, perspective view of an example keyboard assembly including a plurality of piezoelectric actuators for localized haptic feedback.

FIG. 1 illustrates an exploded perspective view of a keyboard assembly 100 (or keyboard 100) implementing force-producing mechanisms to provide localized haptic feedback with respect to each individual, non-actuating key. The keyboard 100 may be peripheral to, or integrated within, any type of computing device where touch-based typing input may be utilized. The keyboard 100 may be physically connected to such a computing device through electrical couplings such as wires, pins, connectors, etc., or the keyboard 100 may be wirelessly connected to the computing device, such as via short-wave radio frequency (e.g., Bluetooth®), or another suitable wireless communication protocol.

The keyboard 100 may include a plurality of individual, non-actuating keys 102(1), 102(2), . . . , 102(N), or buttons, that are provided in an arrangement or layout to enable human input. The keyboard 100 of FIG. 1 illustrates a traditional "QWERTY"-style layout that is familiar to typists who write in English or other languages that use the QWERTY layout. However, the embodiments disclosed herein are not limited to any particular keyboard layout such that keyboards with any number of keys 102(1)-(N) in any arrangement or layout may be utilized without changing the basic characteristics of the keyboard assembly 100.

The keys 102(1)-(N) are "non-actuating" keys in that they do not rely on mechanical actuation of the keys 102(1)-(N) to register key-presses. In this sense, the keys 102(1)-(N) remain substantially fixed and motionless when stress is applied to the tops of the keys 102(1)-(N) by, for example, a human finger. A cover portion 104 of the keyboard assembly 100 includes the non-actuating keys 102(1)-(N). The cover portion 104 may flex slightly under mechanical stress, but the keys 102(1)-(N) do not move or actuate like a traditional mechanically movable key. Accordingly, the cover portion 104 may be made of a suitable plastic or polymer material, such as polyurethane. The material of the cover portion 104 may be semi-rigid to retain its shape, yet flexible enough to minimally displace upon application of moderate mechanical stress. In some embodiments, the keys 102(1)-(N) may be slightly raised on the cover portion 104 to define an area on the cover portion 104 corresponding to each key 102(1)-(N), making them easier to locate with one's fingers, as when a typist is typing without looking at the keyboard 100. Raised tabs, embossed indentations, and the like may be provided on particular ones of the keys 102(1)-(N) to allow a user to locate a home position for their fingers. For example, on a QWERTY layout, the "F" and "J" keys may have features such as raised tabs or indents that allow a user to locate those particular keys solely through the sense of touch. Additionally, each key 102(1)-(N) may be appropriately labeled to identify each key with one or more characters, such as letters, numbers, symbols, etc.

The keyboard assembly 100 may further include a base portion 106 configured to enclose internal components of the keyboard assembly 100 and support the remainder of the keyboard assembly 100. The base portion 106 may be made of any suitably rigid material that provides a support structure for the keyboard 100, such as a reinforced polymer material (e.g., carbon fiber). Other structurally rigid, and relatively light-weight materials may be suitable for the base portion 106 to provide improved portability as well as structural rigidity.

In some embodiments, the keyboard 100 includes a first substrate 108 comprising a plurality of suspended portions 110(1), 110(2), . . . , 110(N) in the first substrate 108. The suspended portions 110(1)-(N) may be mechanically isolated from the remainder of the first substrate 108 in that the suspended portions 110(1)-(N) are configured to mechanically displace or move relative to the first substrate 108 while the remainder of the first substrate 108 remains substantially motionless. The suspended portions 110(1)-(N) may be arranged in a manner that substantially corresponds to a layout of the non-actuating keys 102(1)-(N) of the keyboard 100 which may resemble a grid or array layout. FIG. 1 illustrates interrupted, ring-shaped cutouts, or apertures, in the first substrate 108 as an exemplary means of creating or defining the suspended portions 110(1)-(N). In some embodiments, one or more suspended portions 110(1)-(N) may be associated with each key of the plurality of non-actuating keys 102(1)-(N). For example, while some of the keys 102(1)-(N) may be associated with a single suspended portion 110(1)-(N), other keys 102(1)-(N) may be associated with more than one of the suspended portions 110(1)-(N), such as a group of suspended portions.

FIG. 1 illustrates that the first substrate 108 is a single, unitary piece with the suspended portions 110(1)-(N) defined therein. In other embodiments, the first substrate 108 may comprise an assembly of multiple individual pieces of any size or shape. For example, the substrate 108 may comprise multiple horizontal strips or sections that correspond to each row of keys 102(1)-(N). In yet another example, the substrate 108 may comprise individual portions associated with each of the suspended portions 110(1)-(N), or groups of the suspended portions 110(1)-(N). The individual pieces of the substrate 108 in these embodiments may be assembled in any suitable manner, such as fastening by joints, seams, rivets, pins, welding, adhesive, or any suitable coupling means.

The keyboard assembly 100 may further include a plurality of force-producing mechanisms which may include any suitable mechanism for producing forces, vibrations, pulses, motions, and the like to cause a tactile sensation to be felt on the cover portion 104 of the keyboard 100. Suitable force producing mechanisms include eccentric rotating masses (ERMs), linear resonant actuators (LRAs), voice coil actuators, solenoids, piezoelectric actuators, etc. FIG. 1 represents the force-producing mechanisms as piezoelectric actuators 112(1), 112(2), . . . , 112(N) that are configured to produce a force by leveraging the piezoelectric effect. That is, an electrical field may be applied to the piezoelectric actuators 112(1)-(N) that is perpendicular to the in-plane direction of the actuators 112(1)-(N) such that the piezoelectric actuator 112(1)-(N) exhibits mechanical deformation and strain. The piezoelectric actuators 112(1)-(N) may be coupled to the first substrate 108 at positions of the suspended portions 110(1)-(N). Accordingly, actuation of the piezoelectric actuators 112(1)-(N) causes a force to be produced on the suspended portions 110(1)-(N) of the first substrate 108.

A variety of natural and synthetic materials exhibit the piezoelectric effect (often referred to as the "inverse" piezoelectric effect; the direct piezoelectric effect being the internal generation of electrical charge resulting from an applied mechanical force on the piezo material). Suitable materials for the piezoelectric actuators 112(1)-(N) include, but are not limited to, ceramic materials, crystal materials, and the like. Furthermore, FIG. 1 shows the piezoelectric actuators 112(1)-(N) as being disc-shaped, but any suitable shape may be utilized without changing the basic characteristics of the keyboard assembly 100. For example, the piezoelectric actuators 112(1)-(N) may be square, rectangular, or some other suitable shape, and they may be of variable cross-section thickness or otherwise non-uniform in shape. The piezoelectric actuators 112(1)-(N) can also be multi-layered. The use of the piezoelectric actuators 112(1)-(N) enables a fast-response system needed to simulate a key-click type of haptic feedback.

The suspended portions 110(1)-(N) of the first substrate 108 may be mechanically isolated, but still connected to the first substrate 108 via multiple connection points, described in more detail below. The piezoelectric actuators 112(1)-(N) may be coupled to a first substrate 108 at locations of the suspended portions 110(1)-(N) which may be arranged according to a layout substantially similar to the non-actuating keys 102(1)-(N) of the keyboard 100. The suspended portions 110(1)-(N) may be configured to be deflected in an out-of-plane direction relative to the first substrate 108 (i.e., out of the plane of the first substrate 108) in response to force produced by the actuation of the piezoelectric actuators 112(1)-(N). Additionally, the piezoelectric actuators 112(1)-(N) may be individually controlled and independently actuated such that mechanical force is isolated and local to each non-actuating key 102(1)-(N) of the keyboard 100. By isolating kinetic energy of an actuated piezoelectric actuator 112 to a respective suspended portion 110 of the first substrate 108 beneath each key 102(1)-(N), localized feedback with respect to each key 102(1)-(N) may be provided.

In some embodiments, the first substrate 108 may be electrically conductive in order to help create an electrical field on the piezoelectric actuators 112(1)-(N). Any suitable electrically conductive material such as metal (e.g., copper) may be utilized for the first substrate 108. Additionally, the keyboard assembly 100 may include a second substrate 114 provided underneath the piezoelectric actuators 112(1)-(N) and configured to deliver a drive voltage signal to individual ones of the piezoelectric actuators 112(1)-(N) in order to activate individual ones of the piezoelectric actuators 112(1)-(N). The second substrate 114 may also be electrically conductive and may include conductive traces configured to individually address drive signals to each piezoelectric actuator 112(1)-(N). The second substrate 114 may contact the piezoelectric actuators 112(1)-(N) on the underside of the piezoelectric actuators 112(1)-(N), as will be described in more detail below.

In some embodiments, an insulating layer 116 is provided between the first substrate 108 and the second substrate 114. The insulating layer 116 is configured to insulate the two substrates 108 and 114 from each other and to insulate each piezoelectric actuator 112(1)-(N) from one another. This insulating layer 116 helps to prevent shorting an associated circuit, and also provides structure to the keyboard assembly 100 by filling space in areas between the two substrates 108 and 114 that is unoccupied by the piezoelectric actuators 112(1)-(N). The insulating layer 116 may be any suitable electrically insulating material, such as plastic, polymer material like polyethylene, glass, and the like. The insulating layer 116 includes a plurality of holes 118(1), 118(2), . . . , 118(N), or apertures, to provide space for the piezoelectric actuators 112(1)-(N) to interface with both substrates 108 and 114. In other embodiments, an underside of the first substrate 108 may be coated, or otherwise covered, with a relatively thin layer of insulating paint or similar material except for on the surface areas of the suspended portions 110(1)-(N).

The application of the electrical field to the piezoelectric actuator 112(1)-(N) may be triggered by a key-press event, such as when a user presses a finger on the top of an associated non-actuating key 102(1)-(N). Therefore, a key-press detecting mechanism and associated control circuitry may be provided for detecting such a key-press. Such a mechanism for detecting a key-press may include any suitable force or pressure-sensing mechanism. For example, a pressure sensor may register a key-press upon detecting that an applied pressure meets or exceeds a threshold pressure to register a key-press. Utilizing a threshold to trigger a key-press allows for a user to rest his/her fingers on the keyboard 100 without causing an unwanted key-press to register. Unless and until an applied pressure for an individual key 102(1)-(N) reaches a threshold pressure, a key-press is not registered. The use of a pressure-sensing mechanism allows for construction of a thin keyboard, like keyboard 100, including non-actuating keys 102(1)-(N). The keyboard 100 may be as thin as 3 millimeters (mm) or less. It is to be appreciated that the embodiments disclosed herein are not limited to a pressure-sensing mechanism, however, and that any suitable sensing device may be utilized with the embodiments disclosed herein to detect and register a key-press.

In some embodiments, the force-producing mechanisms, such as the piezoelectric actuators 112(1)-(N), may themselves act as key-press detecting mechanisms, and as such, the force-producing mechanisms may be thought of as "transducers." For example, the piezoelectric actuators 112(1)-(N) may act as transducers when used to detect key-press events upon application of stress on the top of a respective key 102(1)-(N). In this sense the piezoelectric actuator 112(1)-(N), or transducer, can act as both an actuator and a detecting mechanism, or sensor. When a user presses upon a key, the piezoelectric actuator 112(1)-(N) may be deformed, producing an internal electrical charge that may be measured and detected for sensing the key-press by the user. The voltage level created by deformation of the piezoelectric material may be compared to a threshold voltage level at which a key-press event is to be registered. In this scenario, a separate key-press detecting mechanism would not be needed, as the piezoelectric actuator 112(1)-(N) would register a key-press as well as provide simulated haptic feedback.

Figure 2:
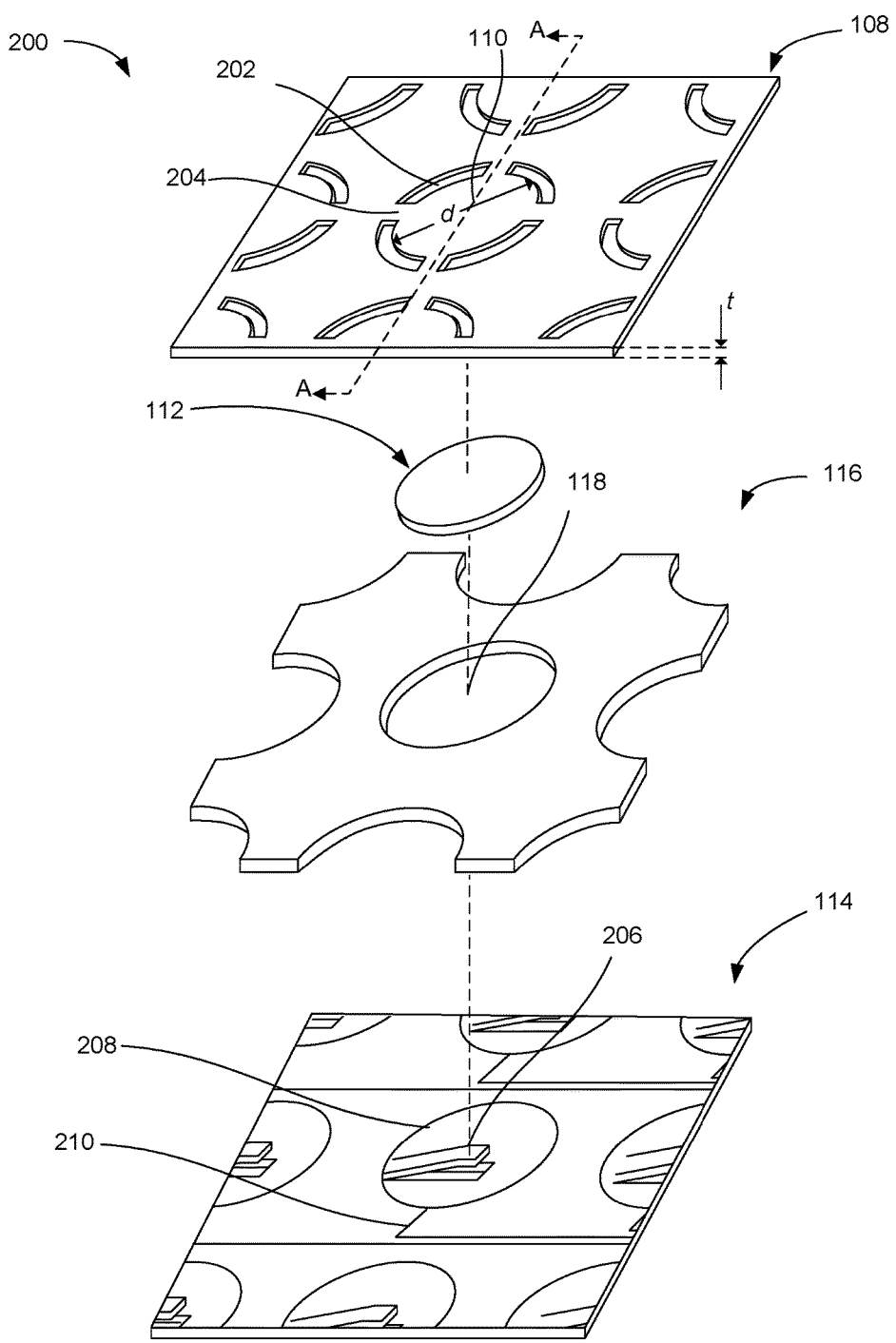
FIG. 2 illustrates a partial exploded, perspective view of a haptic feedback assembly including a piezoelectric actuator provided between portions of two substrates for providing haptic feedback to a non-actuating key of a keyboard.

FIG. 2 illustrates a partial exploded, perspective view of a haptic feedback assembly 200 according to embodiments disclosed herein. The haptic feedback assembly 200 may be part of the overall keyboard assembly, such as the keyboard assembly 100 of FIG. 1. Only a portion of the haptic feedback assembly 200 corresponding to a single key 102 (i.e., a cutout view) is shown for illustrative purposes. FIG. 2 shows a single force-producing mechanism in the form of a piezoelectric actuator 112 that is included in the haptic feedback assembly 200 of the keyboard 100. In some embodiments, the piezoelectric actuator 112 may be in the form of a ceramic disc. The piezoelectric actuator 112 may be coupled to a first substrate 108 including a suspended portion 110 corresponding to the piezoelectric actuator 112. Electrically conductive adhesive may be used to couple the piezoelectric actuator 112 to the underside of the first substrate 108. However, any suitable means of attaching the piezoelectric actuator 112 to the first substrate 108 may be utilized, such as a latch or similar feature that fits over a side of the piezoelectric actuator 112 to hold it in place.

The first substrate 108 may be electrically conductive, and may comprise a plurality of interrupted, ring-shaped apertures, or holes, such as the interrupted, ring-shaped aperture 202 of FIG. 2. The interrupted, ring-shaped aperture 202 may be cut out of a solid material of the first substrate 108 during manufacturing, such as a stamped hole, or a machined cutout made with, for example, a computer numerical control (CNC) machine. The creation of the interrupted, ring-shaped hole 202 creates the suspended portion 110 in the first substrate 108 which is substantially isolated, mechanically, from the remainder of the first substrate 108. The suspended portion 110 may be defined within the first substrate 108 such that it is completely enclosed and surrounded by a main body portion of the first substrate 108, while the space created by the interrupted, ring-shaped aperture 202 allows for the out-of-plane movement and mechanical isolation of the suspended portion 110. The suspended portion 110 is shown in FIG. 2 as being disc-shaped, which is suitable for coupling a disc-shaped piezoelectric actuator 112 thereto, but the suspended portion is not limited to being disc-shaped. A diameter, d, of the suspended portion 110 may be substantially equal to a horizontal length of the key 102 above it.

The interrupted, ring-shaped aperture 202 also yields multiple connection points 204, or anchoring bridges, which interrupt the continuity in the ring-shaped aperture 202 and anchor and suspend the suspended portion 110. The connection points 204 serve to isolate movement of the suspended portion 110. This isolating feature enables localized haptic feedback corresponding to each key 102(1)-(N). Although FIG. 2 shows four connection points 204, the ring-shaped aperture 202 may be configured with any number of connection points 204 as few as two connection points. By using four connection points 204, the suspended portion 110 is provided with sufficient stability and rigidity while also being mechanically isolated from the remainder of the first substrate 108. The connection points 204 may be equidistant and circumferentially spaced about the interrupted, ring-shaped aperture 202.

In some embodiments, the connection points 204 of an electrically conductive first substrate 108 also serve the purpose of conducting electricity to/from the piezoelectric actuator 112, and the suspended portion 110 acts as a conductive backing for the piezoelectric actuator 112. As such, soldering may be reduced or eliminated from the manufacturing process using the first substrate 108 of FIGS. 1 and 2. A thickness, t, of the first substrate 108 is of a suitable thickness to allow for free buckling of the suspended portion 110 upon actuation of the force-producing mechanism, such as the piezoelectric actuator 112. An example thickness for the first substrate 108 may be in the range of 200-400 micrometers (μm).

In some embodiments, an insulating layer, such as the insulating layer 116, is provided between the first substrate 108 and the second substrate 114. The second substrate 114 may be electrically conductive to help create an electrical field on the piezoelectric actuator 112. As such, the insulating layer 116 is configured to insulate the two substrates 108 and 114 from each other and to insulate each piezoelectric actuator 112(1)-(N) from one another. The insulating layer 116 includes holes 118 to provide space for the piezoelectric actuator 112 to interface with both substrates 108 and 114.

In some embodiments, the second substrate 114 may include upwardly-biased strips 206, or tabs, configured to contact the piezoelectric actuator 112 at the underside of the actuator 112. The upwardly-biased strips 206 may be cut from the second substrate 114, or they may be separately manufactured and coupled to the second substrate 114. FIG. 2 shows the upwardly-biased strips 206 cut from the second substrate 114. The piezoelectric actuator 112 may be coated or plated with an electrically conductive material, such as nickel, on the underside of the piezoelectric actuator 112 to provide an electrical connection/contact with the second substrate 114. Other suitable conductive materials (e.g., silver, gold, etc.), or combinations of conductive materials, may be used to coat the underside of the piezoelectric actuator 112. For example, a relatively small amount of tin may be deposited on a plating comprising substantially nickel, which may facilitate soldering or serve other purposes. When the haptic feedback assembly 200 is fully assembled, the piezoelectric actuator 112 presses down on the upwardly-biased strip 206 to remain in firm contact with the upwardly-biased strip 206. In other words, the upwardly-biased strip 206 is "spring-loaded" to bias toward contact with the underside of the piezoelectric actuator 112. By virtue of the electrical connection of the piezoelectric actuator 112 to the upwardly-biased strip 206, the piezoelectric actuator 112 may be connected to a high-voltage amplifier which amplifies a supply voltage of a drive circuit when the haptic feedback assembly 200 is fully assembled.

In some embodiments, an area 208 on the second substrate 114, including the upwardly-biased strip 206 may be provided with a conductive coating configured to provide an electrical connection or contact to the bottom/underside of the piezoelectric actuator 112. The area 208 allows for high voltage to be delivered to each piezoelectric actuator 112 independently. Additionally, conductive traces 210 allow for individual drive signals to be delivered/addressed to each of the piezoelectric actuators 112(1)-(N). This electrical connection at the second substrate 114 also eliminates soldering points on the piezoelectric actuators 112, which in turn facilitates automated manufacturing processes and improves reliability. Elimination of soldering points may also help maintain a desired thinness to the overall keyboard assembly 100 since soldering points add thickness to a design of the keyboard 100.

In fully assembled form, the haptic feedback assembly 200 is positioned underneath the cover portion 104 and above the base portion 106 of the keyboard assembly 100. As previously mentioned, the piezoelectric actuators 112 may act as key-press sensing mechanisms (i.e., transducers) such that they are configured to sense a key-press event in response to stress applied on the top of the keys 102(1)-(N) and resulting deformation of the piezoelectric actuators 112(1)-(N). As such, an additional key-press sensing mechanism may be omitted from the keyboard assembly 100 in this scenario. Alternatively, an additional key-press sensing mechanism, such as a pressure sensitive mechanism, may be added to the keyboard assembly 100 for sensing key-press events.

Figure 3:
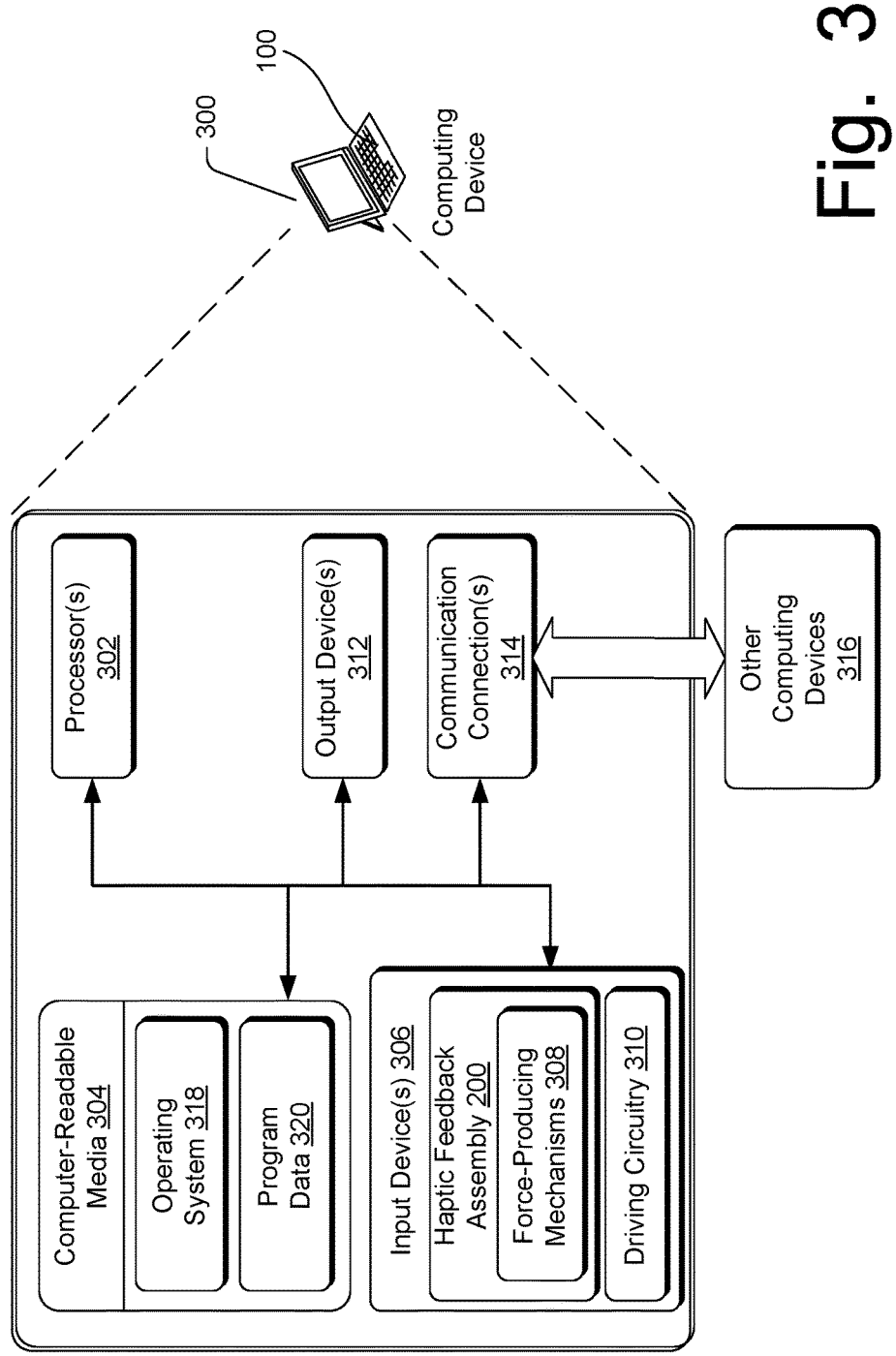
FIG. 3 illustrates an exemplary computing device implementing the haptic feedback assembly.

FIG. 3 illustrates a representative computing device 300 that may be used to implement the keyboard assembly 100 and the haptic feedback assembly 200 of FIGS. 1 and 2. The representative computing device 300 may include one or more of the keyboards 100 of FIG. 1. However, the computing device 300 shown in FIG. 3 is only one illustrative example of a computing device and is not intended to suggest any limitation as to the scope of use or functionality of the computing device. Neither should the computing device 300 be interpreted as having any dependency nor requirement relating to any one or combination of components illustrated in FIG. 3.

In at least one configuration, the computing device 300 comprises one or more processors 302 and computer-readable media 304. The computing device 300 may include one or more input devices 306, such as the keyboard 100 of FIG. 1. The input device 306 may include the haptic feedback assembly of the embodiments disclosed herein, such as the haptic feedback assembly 200 of FIG. 2, including force-producing mechanisms 308. As such, the input device 306 may further include driving circuitry 310 to drive the force-producing mechanisms 308 for producing the haptic feedback desired. The input devices 306 may also include, in addition to a keyboard 100, a mouse, pen, voice input device, touch input device, etc.

The computing device 300 may include one or more output devices 312 such as a display, speakers, printer, etc. coupled communicatively to the processor(s) 302 and the computer-readable media 304. The computing device 300 may also contain communications connection(s) 314 that allow the computing device 300 to communicate with other computing devices 316 such as via a network.

The computer-readable media 304 of the computing device 300 may store an operating system 318, and may include program data 320. The program data 320 may include processing software that is configured to process signals received at the input devices 306, such as detection of a key-press event on the keyboard 100. The program data 320 may also be configured to provide control signals to the driving circuitry 310 for actuating the force-producing mechanisms 308, such as the piezoelectric actuators 110(1)-(N).

The driving circuitry 310 may drive the piezoelectric actuators 112(1)-(N) of FIG. 1. Such driving circuitry may be implemented in an integrated circuit (IC) or similar electrical component and may be configured to generate voltage drive signals to individual piezoelectric actuators 112(1)-(N) at their respective locations in response to the key-press sensing mechanism registering a key-press event at a corresponding key 102(1)-(N). Accordingly, upon registering a key-press event, a processor (e.g., a keyboard processor or controller, or processor 302) may issue an input control signal to produce a voltage drive signal via the driving circuitry 310 for a corresponding piezoelectric actuator 112. The input control signal may be converted to multiple control signals that are each provided to individual piezoelectric actuators 112(1)-(N). Any suitable driving circuitry 310 and waveforms may be utilized without changing the basic characteristics of the keyboard assembly 100. For example, a step function waveform may be utilized with the driving circuitry 310 to produce a key-click type of tactile sensation for a user's finger. Alternatively, a vibratory, or buzzing, type of tactile feedback may be enabled with other types of waveforms (e.g., multiple sinusoidal, high frequency waveforms). Varying magnitudes of force may be produced by varying levels of driving voltage signals.

Figure 4A:
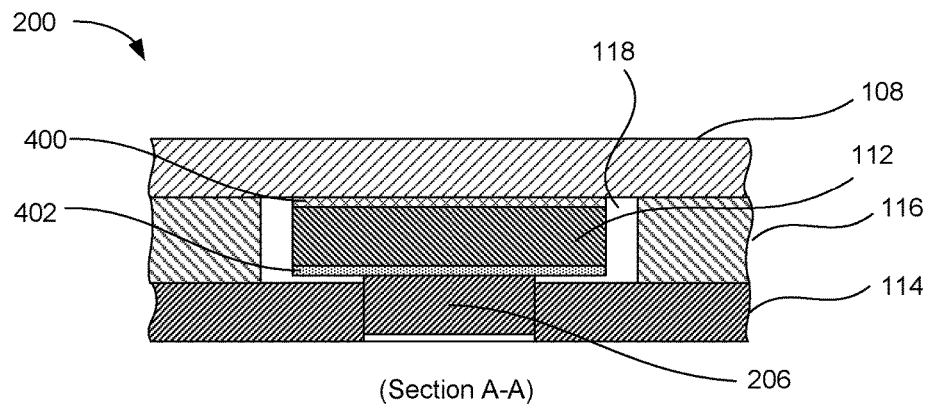
FIG. 4A illustrates a partial side, cross-sectional view of the haptic feedback assembly along section line A-A of FIG. 2, including a piezoelectric actuator configured to deflect a first substrate.

FIG. 4A illustrates a partial side, cross-sectional view of the haptic feedback assembly 200 of FIG. 2 along section line A-A with the haptic feedback assembly 200 in fully assembled form. The portion of the first substrate 108 shown in FIG. 4A may include the suspended portion 110 configured to deflect upon actuation of the piezoelectric actuator 112. The piezoelectric actuator 112 may be coupled to the first substrate 108 using an electrically conductive adhesive 400, tape, or similar bonding material. The second substrate 114 may be configured to provide a high voltage drive signal to the piezoelectric actuator 112. Only a single piezoelectric actuator 112 is shown in FIG. 4A for illustrative purposes.

In the fully assembled configuration of the haptic feedback assembly 200, the upwardly-biased strip 206 is pressed downward, toward in-plane alignment with the second substrate 114. The upwardly-biased nature of the strip 206 ensures that it remains in firm contact with an underside of the piezoelectric actuator 112, which may be coated with a conductive layer 402 of electrically conductive material (e.g., such as silver).

Figure 4B:
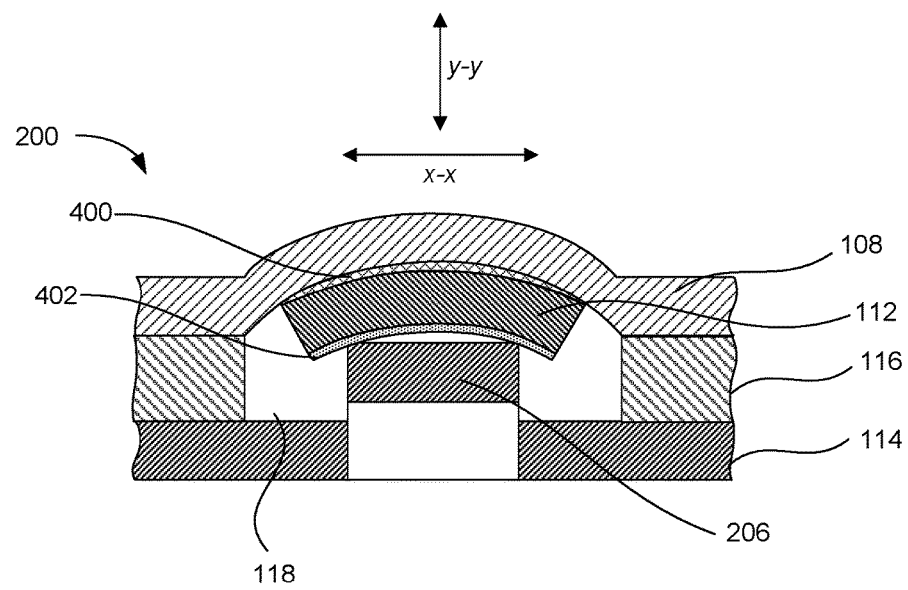
FIG. 4B illustrates the partial side, cross-sectional view of the haptic feedback assembly of FIG. 4A after an electrical field is applied to the piezoelectric actuator causing vertical displacement of the first substrate.

FIG. 4B shows the haptic feedback assembly 200 of FIG. 4A after the piezoelectric actuator 112 is driven with a driving voltage signal. The electrical field created by the voltage drive signal causes the piezoelectric actuator 112 to either expand or shrink in-plane, as shown by the double-arrow, x-x, in FIG. 4B. It is to be appreciated that the expansion or shrinking is in a two-dimensional plane such that the expansion/shrinking would also be directed into, and out of, the page in relation to FIG. 4B. However, the kinetic energy due to expansion/contraction of the piezoelectric actuator 112 in the in-plane (i.e., x-x) direction is converted into a localized, out-of-plane, or vertical buckling or flexing action of the suspended portion 110 of the first substrate 108, as shown by the arrow, y-y, in FIG. 4B. This is primarily due to the coupling of the piezoelectric actuator 112 to the first substrate 108. For example, by coupling the piezoelectric actuator 112 to the first substrate 108 using the electrically conductive adhesive 400, the piezoelectric actuator 112 is mechanically constrained in-plane (i.e., the x-x direction) by virtue of the first substrate 108 being relatively stiff/rigid and substantially resistant to displacement in-plane, even at the suspended portion 110. As a consequence, the piezoelectric actuator 112 is forced to move/deflect, or buckle out-of-plane, or in the vertical (i.e., y-y) direction. This deflection action produces a force on the cover portion 104 of the keyboard 100 by virtue of the adjacency of the first substrate 108 to the cover portion 104 which provides a tactile sensation to a user's finger in contact with an associated key 102(1)-(N) on the cover portion 104. Furthermore, the mechanical isolation of the suspended portion 110 causes a localized tactile sensation at the key 102 that is positioned above the piezoelectric actuator 112 that mimics a key-click at the cover portion 104 of the keyboard assembly 100.

As one illustrative example, when a user presses an individual one of the keys 102(1)-(N) on the keyboard 100, the piezoelectric actuator 112 associated with the pressed key 102 may be actuated in response to the detected key-press. The actuation of the piezoelectric actuator 112 causes a deflection of the suspended portion 110 that the piezoelectric actuator 112 is coupled to, as shown in FIG. 4B. This deflection of the suspended portion 110 results in a localized tactile sensation felt by the user's finger that is touching the pressed key 102.

Figure 5:
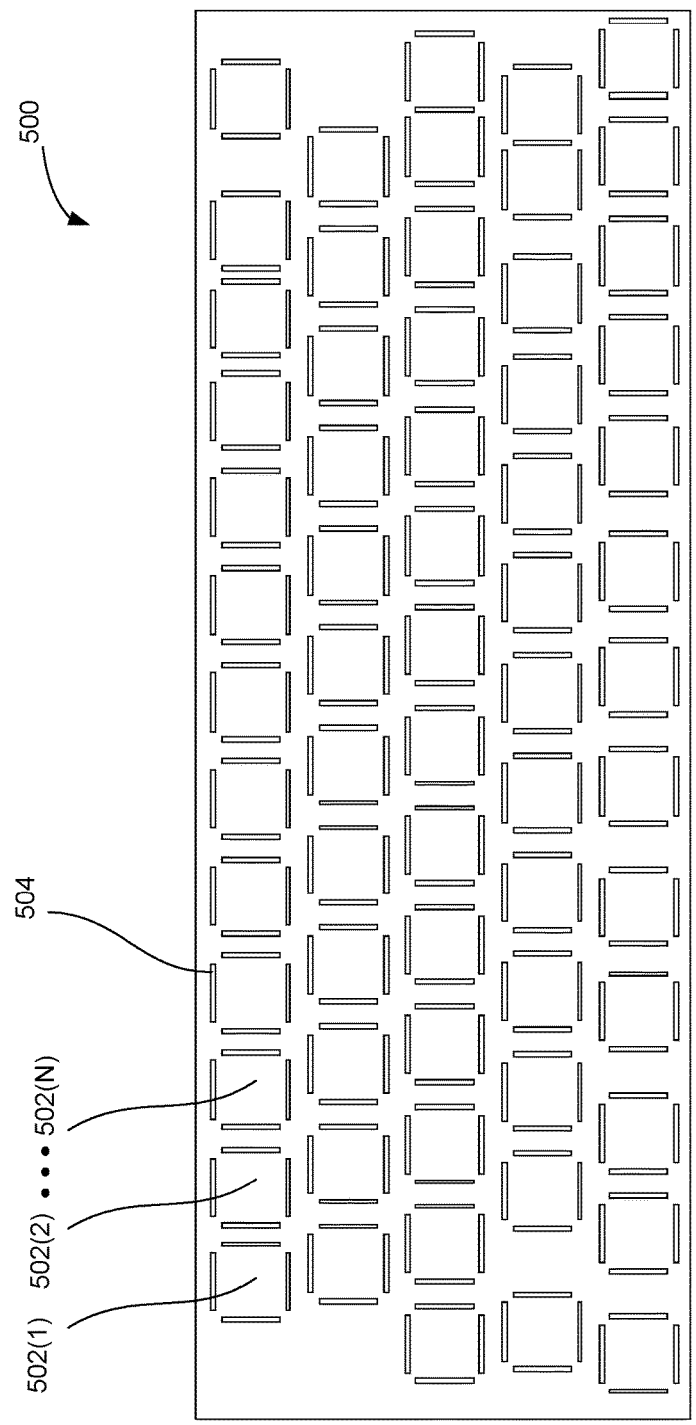
FIG. 5 illustrates an example first substrate according to another embodiment in which suspended portions are substantially square-shaped.

FIG. 5 illustrates another example first substrate 500 according to another embodiment. The first substrate 500 may comprise a plurality of substantially square-shaped suspended portions 502(1), 502(2), ..., 502(N) defined in the first substrate 500. The suspended portions 502(1)-(N) may be mechanically isolated from the remainder of the first substrate 500, similar to the first substrate 108 of FIGS. 1, 2 and 4, in that the suspended portions 502(1)-(N) are configured to mechanically displace or move out-of-plane relative to the first substrate 500 while the remainder of the first substrate 500 remains substantially motionless. The suspended portions 502(1)-(N) may further be arranged in a manner that substantially corresponds to a layout of the non-actuating keys 102(1)-(N) of the keyboard 100 which may resemble a grid or array layout. Specifically interrupted, square-shaped cutouts 504, or apertures, in the first substrate 500 may be used as a means of creating or defining the suspended portions 502(1)-(N).

Figure 6:
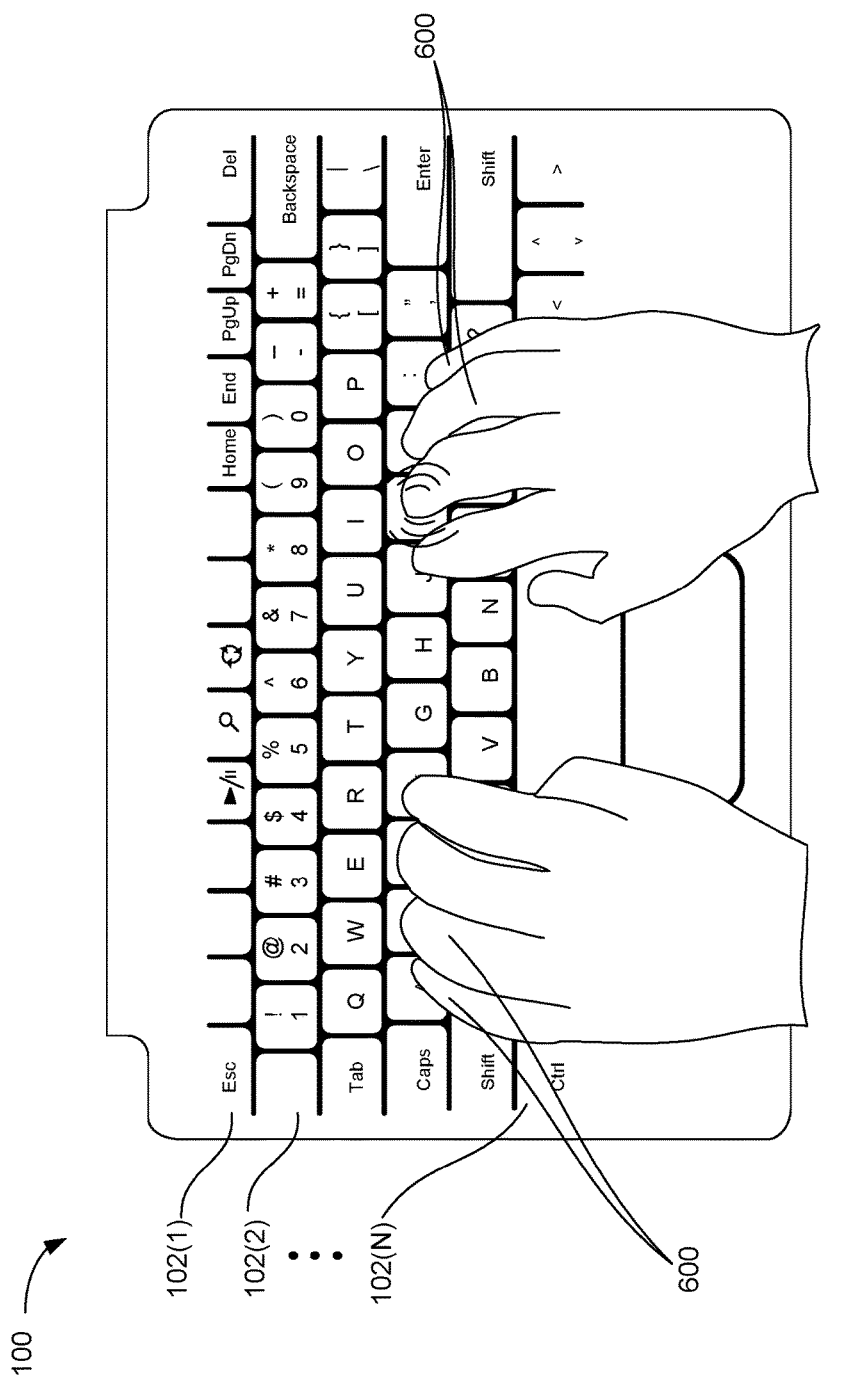
FIG. 6 illustrates localized haptic feedback provided on a keyboard implementing the haptic feedback assembly.

FIG. 6 illustrates an example keyboard 100 including the haptic feedback assembly of the embodiments disclosed herein. A user, such as a typist, may rest his/her fingers 600 on the keyboard 100, such as when his/her fingers 600 are in a home position familiar to trained typists for use in eyes-free typing. A key-press event may not be registered until a pressure on the top of a key 102(1)-(N) meets or exceeds a threshold pressure and is detected by a key-press sensing mechanism. Upon detecting or registering a key-press at a given key 102(1)-(N), a force-producing mechanism, such as the piezoelectric actuator 112 may produce a simulated haptic response to the key-press event. As described above with reference to the previous figures, this response may be localized to the specific key that was pressed upon such that the other fingers 600 that are resting on the keyboard 100 do not feel a tactile sensation. That is, only the finger that pressed the key 102 may feel the tactile sensation caused by the force-producing mechanism. In practice, the deflection of one of the suspended portions 110 of the first substrate 108 may cause some discernible movement of the first substrate 108 surrounding the deflected suspended portion 110, which may result in a discernible, albeit much smaller, tactile sensation to be felt at neighboring keys 102(1)-(N) to the key 102 associated with the deflected suspended portion 110. However, this so called "leaked" haptic feedback near neighboring keys 102(1)-(N) may be masked, or otherwise not perceived, by a user because the presence of the stronger signal at the pressed key 102 tends to mask the weaker signals that are leaked near neighboring keys. FIG. 6 shows that one of the fingers 600 of the user's right hand feels the haptic feedback after pressing upon that key (e.g., the "K" key) which registered a key-press. It is to be appreciated that the user may press upon multiple keys 102(1)-(N) (e.g., SHIFT and "K") simultaneously, or at the same time in sequence, which will cause respective haptic feedback to be felt by both fingers 600 that pressed the multiple keys.

The environment and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:
1. A keyboard comprising:
   a plurality of keys defined on a cover portion of the keyboard and configured to receive touch input, the plurality of keys being physical, non-actuating keys;
   a first substrate underneath the cover portion comprising a plurality of suspended portions arranged on the first substrate to substantially correspond to a layout of the plurality of keys, individual suspended portions of the plurality of suspended portions being suspended from the first substrate by multiple connection points; and
   a plurality of force-producing mechanisms underneath the first substrate, individual force-producing mechanisms of the plurality of force-producing mechanisms being positioned underneath the individual suspended portions; and
   a second substrate underneath the plurality of force-producing mechanisms, the second substrate being electrically conductive and comprising a plurality of contacts, a contact of the plurality of contacts being configured to maintain contact with a force-producing mechanism of the plurality of force-producing mechanisms and deliver a drive signal to the force producing mechanism.

2. The keyboard of claim 1, wherein the first substrate is adjacent to the cover portion.

3. The keyboard of claim 1, wherein the individual suspended portions are defined by a ring-shaped aperture in the first substrate, a continuity of the ring-shaped aperture being interrupted by the multiple connection points.

4. The keyboard of claim 1, wherein the multiple connection points comprise at least three connection points.

5. The keyboard of claim 1, wherein the plurality of force-producing mechanisms comprise piezoelectric actuators.

6. The keyboard of claim 5, wherein the first substrate is electrically conductive, and the piezoelectric actuators are coupled to the first substrate with electrically conductive adhesive.

7. The keyboard of claim 5, wherein a piezoelectric actuator of the piezoelectric actuators is coated with a conductive layer on an underside of the piezoelectric actuator.

8. The keyboard of claim 1, wherein the contact comprise an upwardly-biased strip, and wherein the drive signal is delivered via the upwardly-biased strip, to the force-producing mechanism, in response to detecting a key-press event.

9. The keyboard of claim 1, wherein the first substrate is electrically conductive, the keyboard further comprising an insulating layer between the first substrate and the second substrate, the insulating layer comprising a plurality of holes to facilitate interfacing between the plurality of force-producing mechanisms and the first and the second substrates.

10. An electronic device comprising:
a cover portion;
a plurality of keys physically defined on the cover portion and configured to receive touch input, the plurality of keys being non-actuating;
a first substrate underneath the cover portion, the first substrate comprising one or more suspended portions positioned underneath one or more keys of the plurality of keys;
a second substrate underneath the first substrate, the second substrate being electrically conductive and comprising one or more tabs; and
one or more force-producing mechanisms positioned between the first substrate and the second substrate, a tab of the one or more tabs being configured to maintain contact with a force-producing mechanism of the one or more force-producing mechanisms and deliver a drive signal to the force-producing mechanism.

11. The electronic device of claim 10, wherein the drive signal is delivered in response to a key-press registered for a key of the plurality of keys that is associated with the force-producing mechanism.

12. The electronic device of claim 10, wherein individual suspended portions of the one or more suspended portions are suspended within the first substrate by multiple connection points spaced across an aperture defined in the first substrate.

13. The electronic device of claim 12, wherein the aperture defined in the first substrate comprises a square-shaped aperture.

14. The electronic device of claim 12, wherein the multiple connection points are equidistant.

15. The electronic device of claim 10, wherein the one or more force-producing mechanisms comprise one or more piezoelectric actuators.

16. The electronic device of claim 10, wherein the first substrate comprises an electrically conductive material.

17. The electronic device of claim 16, wherein the one or more force-producing mechanisms are coupled to the first substrate with electrically conductive adhesive.

18. A method comprising:
detecting a key-press at a key of a plurality of keys configured to receive touch input, the plurality of keys being non-actuating and physically defined on a cover portion of a keyboard; and
at least partially in response to the detecting the key-press, providing, via a contact that is touching a force-producing mechanism and is disposed on a second substrate that is electrically conductive and positioned underneath the cover portion, a drive signal to the force-producing mechanism, the force-producing mechanism being positioned underneath a suspended portion of a first substrate, the first substrate being positioned between the second substrate and the cover portion.

19. A method of claim 18, wherein the key-press is detected by a pressure sensor.

20. A method of claim 18, wherein providing the drive signal comprises providing a drive voltage signal via a conductive trace included in the second substrate.

* * * * *